US007848433B1

(12) United States Patent
Reibman et al.

(10) Patent No.: US 7,848,433 B1
(45) Date of Patent: Dec. 7, 2010

(54) SYSTEM AND METHOD FOR PROCESSING DATA WITH DRIFT CONTROL

(75) Inventors: Amy Ruth Reibman, Matewan, NJ (US); Leon Bottou, Highlands, NJ (US); Andrea Bassi, Ocean, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 858 days.

(21) Appl. No.: 11/179,979

(22) Filed: Jul. 12, 2005

Related U.S. Application Data

(63) Continuation of application No. 09/683,122, filed on Nov. 21, 2001, now Pat. No. 6,961,383.

(60) Provisional application No. 60/252,525, filed on Nov. 22, 2000.

(51) Int. Cl.
*H04B 1/66* (2006.01)
(52) U.S. Cl. .................................. 375/240.25
(58) Field of Classification Search ............ 375/240.16, 375/240.12, 240.1, 240.01, 240.15, 240.13; 382/238; *H04B 1/66*
See application file for complete search history.

(56) References Cited

U.S. PATENT DOCUMENTS

| 5,485,279 | A | * | 1/1996 | Yonemitsu et al. ..... | 375/240.14 |
| 5,973,739 | A | * | 10/1999 | Nilsson .................... | 375/240.1 |
| 6,028,634 | A | * | 2/2000 | Yamaguchi et al. ..... | 375/240.16 |
| 6,408,096 | B2 | * | 6/2002 | Tan ............................. | 382/232 |
| 6,501,797 | B1 | * | 12/2002 | van der Schaar et al. ..................... | 375/240.12 |
| 6,539,058 | B1 | * | 3/2003 | Pearlstein et al. ...... | 375/240.25 |
| 6,614,936 | B1 | * | 9/2003 | Wu et al. .................... | 382/238 |
| 6,631,163 | B1 | * | 10/2003 | Peng ....................... | 375/240.25 |
| 6,700,933 | B1 | * | 3/2004 | Wu et al. ................ | 375/240.16 |
| 6,731,811 | B1 | * | 5/2004 | Rose .......................... | 382/238 |
| 6,782,132 | B1 | * | 8/2004 | Fogg ........................ | 382/232 |
| 6,907,070 | B2 | * | 6/2005 | Wu et al. ................ | 375/240.12 |
| 6,961,383 | B1 | * | 11/2005 | Reibman et al. ....... | 375/240.25 |
| 6,996,173 | B2 | * | 2/2006 | Wu et al. ................. | 375/240.1 |
| 2004/0125952 | A1 | * | 7/2004 | Alattar et al. ............... | 380/202 |

OTHER PUBLICATIONS

Arnold et al, "Efficient drift-free signal-to-noise ratio scalability", IEEE Transactions on Circuits and Systems for Video Technology, vol. 10, iss. 1, pp. 70-82, Feb. 2000.*
Iwahashi et al, "Design of motion compensation filters of frequency scalable coding-drift reduction", IEEE International Symposium on Circuits and Systems, vol. 3, pp. 277-280, Jun. 1994.*

* cited by examiner

*Primary Examiner*—Tung Vo

(57) ABSTRACT

A system, method and computer-readable media are introduced that relate to data coding and decoding. A computing device encodes received data such as video data into a base layer of compressed video and an enhancement layer of compressed video. The computing device controls drift introduced into the base layer of the compressed video. The computing device, such as a scalable video coder, allows drift by predicting the base layer from the enhancement layer information. The amount of drift is managed to improve overall compression efficiency.

22 Claims, 5 Drawing Sheets

SYSTEM AND METHOD FOR PROCESSING DATA WITH DRIFT CONTROL

CROSS REFERENCE TO RELATED APPLICATIONS

This application claims priority to U.S. Non-provisional application Ser. No. 09/683,122, filed Nov. 21, 2001, the contents of which are incorporated herein by reference, which application claims priority to United States Provisional Application "MANAGING DRIFT IN DCT-BASED SCALABLE VIDEO CODING," Ser. No. 60/252,525, filed on Nov. 22, 2000, the contents of which are incorporated by reference herein.

BACKGROUND OF INVENTION

The present invention relates to video compression technology and, more particularly, to scalable video coders.

Compressed video, which uses predictive coding algorithms and variablelength coding, is sensitive to network impairments since these can cause error propagation. A single bit error or erasure can cause substantial degradation if no action is taken to stop or limit the extent of error propagation. Motion compensation allows the error to propagate both temporally and spatially. Because of this, there has been extensive effort in the video community to design new techniques that limit the extent of error propagation. However, almost all attempts to limit error propagation decrease the coding efficiency, some dramatically so. To ensure the best operation of the video coder in an errorprone channel, the balance between resilience and efficiency must be managed carefully.

Scalable coding algorithms create a partitioning of the compressed bitstream into more and less important parts. This allows a natural combination with different mechanisms to prioritize network transport, for example, marking less important parts for early discard, applying unequal error protection, or facilitating rate matching between encoder and network. When used in conjunction with such techniques, scalable video can be very resilient to network introduced errors.

The propagation of enhancement-layer errors into the base-layer reconstruction is referred to herein as "drift" (this is in contrast to the more general term "error propagation" which is used herein to include the result of partial reception of the more important base-layer information). Early scalable video coders (like MPEG2 SNR scalability (SNRS)) allowed drift by using lowpriority enhancement-layer information to predict the highpriority base-layer. However, in recent years, the development of scalable video encoders (like H.263 SNRS and spatial scalability (SS)) has focused on eliminating drift. In these algorithms, the base-layer is predicted only from the base-layer information. This strategy has been taken one step further in the development of MPEG4 Fine Granularity Scalability (FGS), in which the enhancement-layer information is also predicted only from base-layer information.

However, while recent scalable video coding algorithms are becoming more efficient at compressing the video, they lose compression efficiency because they ignore all enhancement-layer information when predicting the base-layer. In particular, recent experiments show that with MPEG2 SS, MPEG4 and H.263 scalability modes all suffer from 0.5-1.5 dB losses for every layer. FGS has particularly poor compression inefficiency because of its restricted prediction strategy.

SUMMARY OF INVENTION

Despite the predominance of arguments in the prior art for designing video compression systems that eliminate drift, the present invention is based on the observation that if one can effectively manage error propagation in both a one-layer encoder and a two-layer encoder that does not allow the introduction of base-layer drift, it is possible to design an encoder that does allow the introduction of drift into the base-layer.

It is an object of the invention to provide means to introduce drift incrementally.

It is an object of the invention to provide a way for the encoder to measure the drift being potentially introduced.

It is an object of the invention to provide encoding options that can allow drift, while simultaneously keeping the amount of drift under control.

It is an object of the invention to provide means to drastically reduce or eliminate drift without the need for a full I-frame.

It is an object of the invention to provide a system-level optimization, designed to maximize expected quality across all expected receivers.

The present invention is directed to structures for scalability that use previous enhancement-layer information in a video stream to predict the current base-layer, while simultaneously managing the resulting possibility of drift. These structures allow better compression efficiency, while introducing only limited impairments in the quality of the reconstruction.

These and other advantages of the invention will be apparent to those of ordinary skill in the art by reference to the following detailed description and the accompanying drawings.

DETAILED DESCRIPTION

Figure 1:
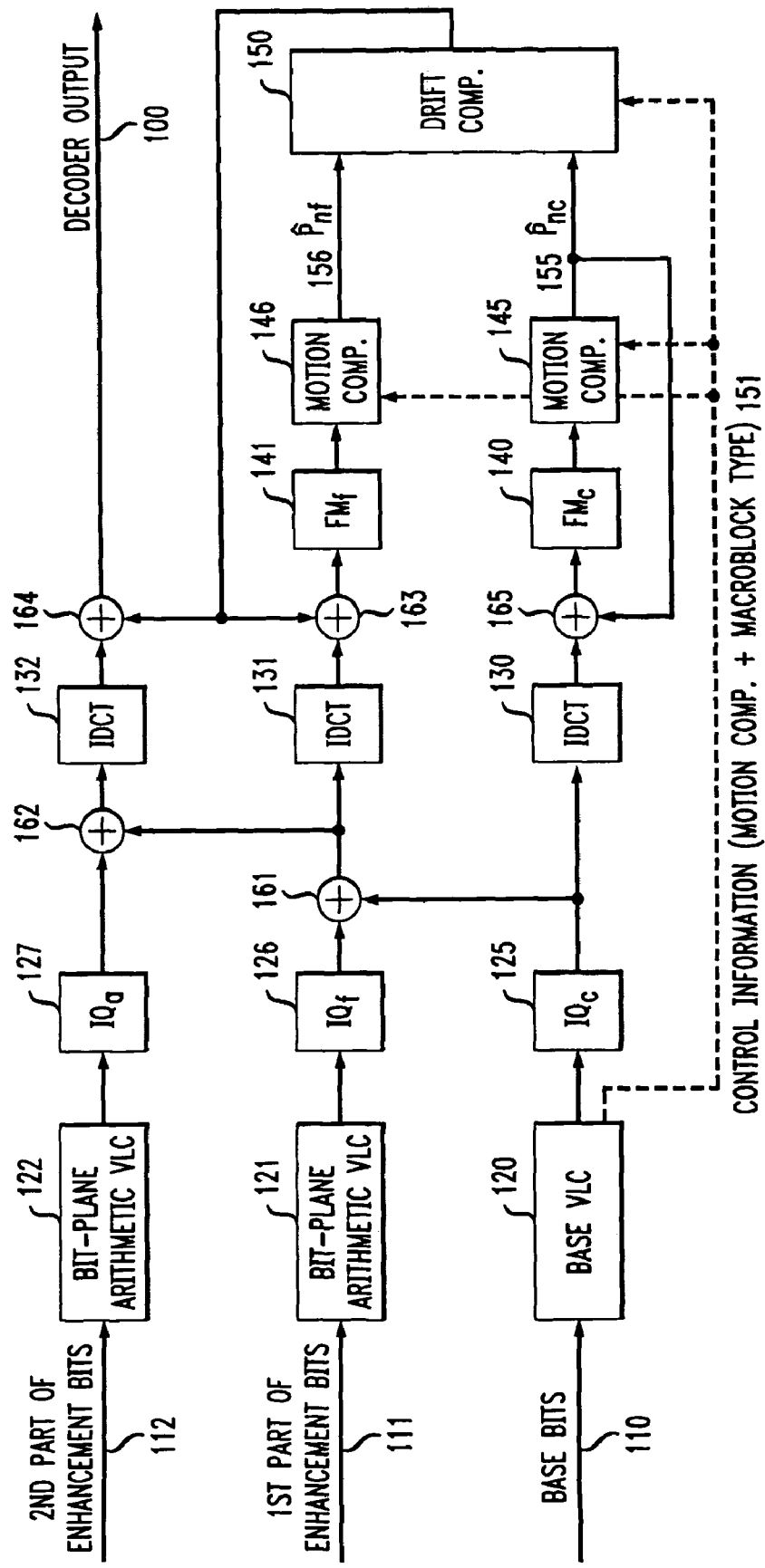
FIG. 1 is a block diagram of a two-loop decoder with drift control, embodying aspects of the invention.

FIG. 1 sets forth a simplified block diagram of a scalable DCT-based motion-compensated video decoder with drift control, illustrating an embodiment of the present invention. The decoder takes three levels of Input, as shown in FIG. 1. The base bits 110, with bit rate $$R_{nc}$$

are assumed to be always available. The enhancement bits are divided into a first part 111 and a second part 112. The first part of the enhancement bits 111, with bitrate $$R_{nf} - R_{nc}$$

may not be received by the decoder, but if received, are used to predict the next frame. The second part of the enhancement bits 112, with bit rate $$R_{na} - R_{nf}$$

may not be received, and is never used to predict the next frame. The base layer bits are assumed to include control information 151, i.e. motion vectors for motion compensation and macroblock type information, the use of which is described in further detail herein.

The bit stream inputs of FIG. 1, first, are used at 120, 121, 122 to extract and decode the variable length coded (VLC) words to obtain locations and quantizer values of the DCT coefficients for each block. The non-zero DCT coefficients are reconstructed at 125 from the base layer. At the base layer, the DCT coefficients are coarsely quantized. The enhancement layer information encodes the difference between the non-quantized DCT coefficients and the quantized coefficients from the base layer with finer quantization stepsize. These differences, if available, are reconstructed at 126 and 127 and combined at adders 161 and 162 with the base layer reconstruction to obtain the DCT coefficients. Inverse discrete cosine transform (DCT) 132 is used to obtain the quantized block pixel values. Motion compensation is performed and provided at adder 164. By processing the bit streams of both the base layer and enhancement layer, the highest quality video signal 100 may be reconstructed.

Figure 2:
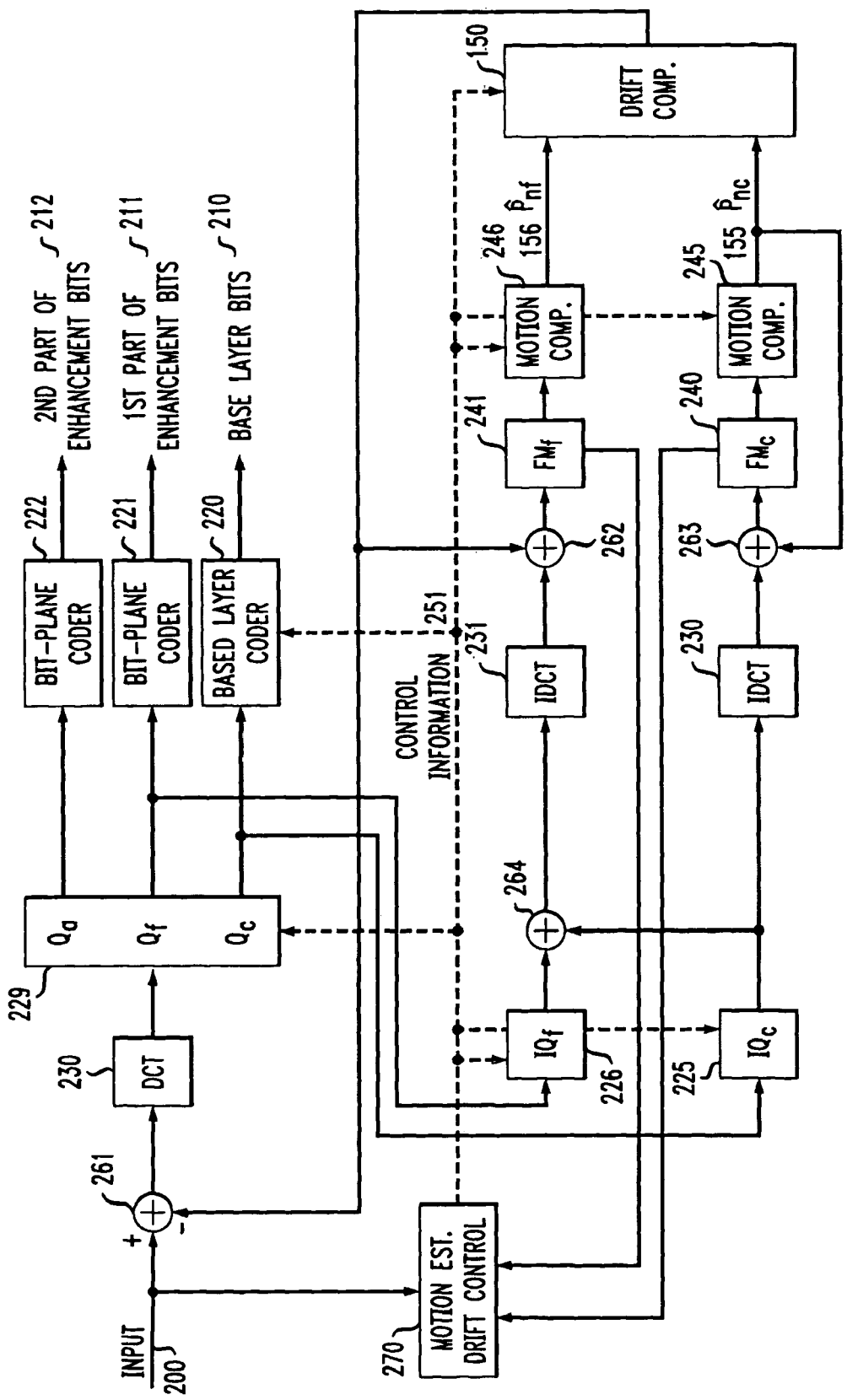
FIG. 2 is a block diagram of a two-loop encoder with drift control, embodying aspects of the invention.

Both the decoder shown in FIG. 1 and the encoder shown in FIG. 2 maintain two frame memories: referred to by the inventors as a "coarse" frame memory and a "fine" frame memory. The coarse and fine frame memories are shown in FIG. 1 as 140 and 141, with corresponding motion compensation 145, 146 and inverse DCT 130, 131. The "coarse" frame memory 140 depends only on the base bits and never drifts. The "fine" frame memory 141 is updated by first combining both motion compensated frame memories, and then applying the base bits and the first part of the enhancement bits. The fine memory drifts when some of these enhancement bits are lost.

The motion-compensated predictions from the coarse and fine memories 140 and 141 are referred to as $$\hat{P}_{nc}$$

and $$\hat{P}_{nf}$$

for a macroblock n and are labelled as 155 and 156 respectively in FIG. 1. For simplicity, the same motion vectors can be used for both predictions. For each macroblock, the drift compensation component 150 in FIG. 1 combines the coarse and fine predictions according to a macroblock type information. As mentioned above, the macroblock type information is included in the control information 151 of the base layer bits. The macroblock type information is utilized to control and manage the introduction of drift into the base layer.

Figure 3:
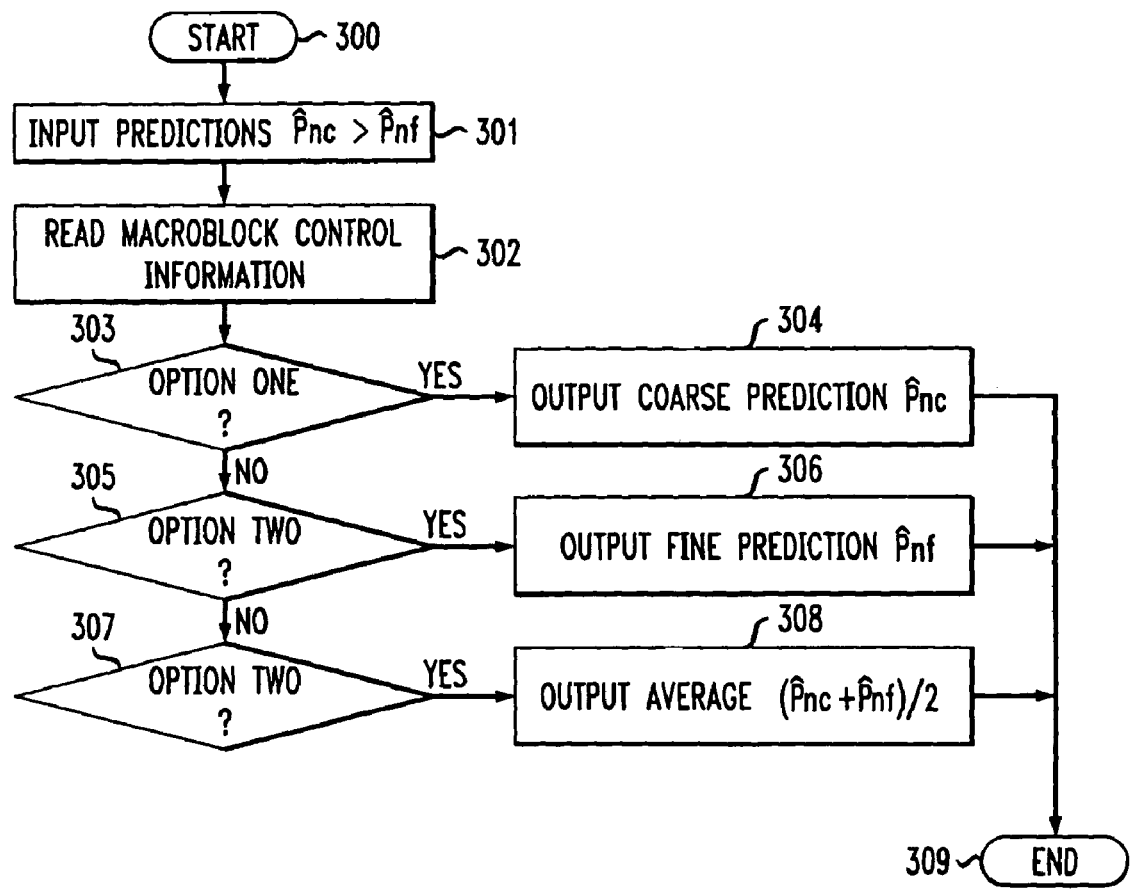
FIG. 3 is a flowchart illustrating the operation of the drift compensation component of the decoder, in accordance with an embodiment of the invention.

FIG. 3 is a flowchart illustrating the operation of the drift compensator 150. The coarse and fine predictions are input at step 301. At step 302, the macroblock control information is read. For simplicity, only three drift management options are shown in FIG. 3. The first option, at steps 303-304, eliminates drift by taking the coarse prediction $$\hat{P}_{nc}$$

only (as in FGS). The second option, at steps 305-306, allows drift by taking the fine prediction $$\hat{P}_{nf}$$

only (as in MPEG2 SNRS). The third option, at steps 307-308, reduces—but does not eliminate—drift by averaging both predictions $$(\hat{P}_{nc} + \hat{P}_{nf})/2$$

Although only three options are shown in FIG. 3, introducing new combinations would naturally extend the present scheme.

FIG. 2 sets forth a simplified block diagram of a scalable DCT video encoder with drift control, corresponding to the decoder in FIG. 1. A video sequence is input at 200. The DCT 230 is applied to each block and the DCT coefficients are quantized at 229. As mentioned above, the DCT coefficients are coarsely quantized at the base layer using quantizer $Q_c$. The enhancement layer information encodes the difference between the non-quantized DCT coefficients and the quantized coefficients from the base layer with finer quantization stepsizes. The base layer bits 210 are created by coding the coarse quantizer values using variable length code (VLC) tables 220. The base layer VLC as shown in FIG. 2 relies on arithmetic bitplane coding, but could also be implemented, without limitation, using the conventional Huffman method. The results of the other quantizers $Q_f$ and $Q_a$ are also bit-plane coded at 221 and 222 to produce the first and second enhancements bits, 211 and 212 respectively. The first frame of the video sequence (an I-frame) is encoded without reference to any past or future frames. Motion compensation is utilized at adder 261 with regard to subsequent P frames. The encoder tracks a coarse and fine frame memory 240 and 241, corresponding to the coarse and fine frame memories 140 and 141 of the decoder. The frames stored in the coarse and fine frame memories 240 and 241 are reconstructed using inverse DCT 230, 231 and inverse quantizers 225, 226. Corresponding motion compensation 245 and 246 are utilized to obtain the coarse and fine predictions 255 and 256, which are utilized by the drift compensator 250, as described above, to compute a combination based on control information 251. A drift control/motion estimator 270 is utilized by the encoder to provide control information 251 to the quantizers, to the motion compensation units, to the drift compensator, and for encoding in the base layer. The motion estimator 270 chooses motion vectors, as is well understood in the art, which are included in the control information encoded in the base layer. The drift control 270, using the video input 200 and the frame memories 240, 241, chooses a particular combination mode for the drift compensator 250 and adjusts quantization in an advantageous manner, as further described herein.

To minimize the influence of drift in general, it is advantageous to use an embedded coder to compress each individual frame. This allows more significant enhancement layer bitplanes to be received and decoded even if the network does not have sufficient bandwidth to send the entire enhancement layer. A scalable video bitstream must indicate the relative importance of bits or groups of bits within the bitstream. This information is necessary to facilitate transport mechanisms that respond to the observed channel characteristics by discarding the least important bits or by applying error correction to the more important bits. In FIG. 2, a scalable bitstream is produced by a binary adaptive Z-Coder, see L. Bottou et al., "The Z-Coder Adaptive Binary Coder," Proc. IEEE Data Compression Conference 1998, which is incorporated by reference herein, and prioritization is imposed by the order in which information is encoded during a "coding run".

The Z-Coder coder represents probability distributions using context variables. Internal state and context variables are initialized at the beginning of each coding run and are updated after coding each binary decision. If a piece of the bitstream is missing, the decoder cannot perform identical updates and must stop. Decoding can resume at the beginning of the next coding run. Hence, more important information should be encoded early in the coding run to ensure it is received prior to any information loss.

Shorter coding runs increase robustness to random losses in the channel. However, where prioritized transport is assumed, very short coding runs will not be useful in the system. Longer coding runs typically improve the coding efficiency because the contexts do not need to be relearned at the beginning of every coding run. A typical single frame requires 1.072 or 0.513 bits per pixel when quantized with Q=4 or Q=8 respectively. If the same frame is encoded 256 times without resetting the adaptation contexts after encoding each copy, the resulting bitrates are 1.069 and 0.509 bits per pixel respectively. This suggests that no more than 1% of the bandwidth could be saved by coding several frames per coding run. Further, latency becomes problematic if there are several frames per coding run. The inventors have selected for their experiments a scalable coder which performs one coding run per frame.

Within each coding run, binary decisions are encoded by decreasing order of importance. We start with the macroblock type, quantization and motion information, followed by the DCT coefficient information for the base layer and the various enhancement layers. The DCT coefficients are encoded as a sequence of binary decisions ordered according to their importance. The coefficients in each 8×8 block are first divided by the finest quantizer $Q_a$, resulting in an integer quotient with absolute value that can always be represented using twelve bits. Each elementary bitplane coding operation then processes one particular bitplane of one particular 8×8 block of DCT coefficients. Each elementary coding operation belongs either to the base layer or to one of the two refinement layers, according to the bitplane number and to the values of the $Q_c=Q_a$ and $Q_f=Q_a$ ratios for the corresponding macroblock. First, the base layer is encoded by performing all the base layer elementary coding operations starting with the most significant bitplanes, and proceeding towards the least significant bitplane. Then each refinement layer is encoded by similarly performing all the elementary coding operations for that layer in decreasing order of bitplane significance. The Z-Coder internal state is flushed after each layer in order to clearly delimit the bitstream for each layer.

To perform an elementary coding operation, the coder loops over the 64 coefficients and codes whether the binary representation of its absolute value contains a 0 or a 1 for the current bitplane. The sign bit is coded just after coding the first 1 of each coefficient. Such coefficients are named significant. Previous bit plane coders take advantage of the wavelet transform structure by coding decisions addressing the significance of entire coefficient groups. The same result is achieved for zig-zag ordered DCT coefficients by coding a stopping decision after each significant coefficient. A positive stopping decision indicates that none of the remaining coefficients will be significant after processing this bitplane. When it is known that some remaining coefficients are already significant, there is no need to code the stopping decision.

This encoding process produces a high bandwidth bitstream. Lower bandwidth channels are accommodated by simply truncating a fixed proportion of the second refinement layer. Even lower bandwith channels are accommodated by eliminating the second refinement layer altogether and truncating a fixed proportion of the first refinement layer. Extremely low bandwidth channels might be dealt with by eliminating both refinement layers and truncating the base layer. Here, the truncation process is facilitated by dividing the bitstream into "chunks", with one chunk per layer per frame. Each chunk is preceded by a one- to three-byte length indicator, indicating how many bytes are in the chunk. There are three chunks per frame, corresponding to the base layer, the first part of the enhancement layer, and the second part of the enhancement layer.

The encoder in FIG. 2 tracks both frame memories under the assumption that all bits are received by the decoder. The encoder makes several decisions that affect the decoder drift in the fine memory. The first decision is the selection of a combination mode for the drift compensation. The second decision involves the number of bitplanes that might be used in the prediction loop; this is accomplished by adjusting the quantization $Q_f$ relative to the final quantization $Q_a$. Although not shown in FIG. 2, a third technique could be to apply a filter to the prediction from the coarse loop in order to smooth the discontinuities associated with prediction blocks that straddle macroblock boundaries.

Different images have different tradeoffs between efficiency and resilience as a function of these drift control decisions. The encoder must make these decisions and send this information to the decoder. The encoder makes these choices on a macroblock basis with the goal of optimizing the total system performance.

The traditional (often implicit) optimization when designing a scalable coder is to minimize the maximum possible distortion at the decoder, subject to the constraint that the channel rate R is $$\overline{R}_c \leq R \leq \overline{R}_a$$

Typically, both $$\overline{R}_c$$

and $$\overline{R}_a$$

are known, although neither the instantaneous channel rate nor the average channel rate in some time interval is known. This maximum distortion is achieved for the minimum rate $$\overline{R}_c$$

Thus, optimizing using this criterion leads to a prediction process that does not tolerate any drift in the base layer. However, this also results in larger than necessary distortions at rates near $$\overline{R}_a$$

Following is a discussion of some alternate criteria for optimization, to achieve better compression at high rates without sacrificing too much quality at lower rates.

One optimization criterion is to minimize the distortion at the highest rate, subject to constraint that the drift at the lowest rate is kept below some value. This can be expressed as $$\min\{D_a\}$$

subject to $D_c \leq \overline{D}_c$
and the rate constraints
$R_c \leq \overline{R}_c$ and $R_a \leq \overline{R}_a$ Here, $R_c$ and $R_a$ are the rates associated with the base bits, and all the bits, respectively, and $D_c$ and $D_a$ are the distortions of the associated reconstructions.

An alternate optimization criterion is to minimize the distortion averaged across all possible channel rates, subject to the rate constraints shown above. Determining the average distortion, however, requires knowledge of the probability distribution of the rates. This information is typically not available. However, a simple approximation is to minimize a weighted distortion $$w_c D_c + (1 - w_c) D_a$$

subject to the rate constraints set forth above. The choice of the weights is influenced by the application These two constrained optimizations can be solved by converting them to unconstrained Lagrangian optimizations. The unconstrained optimization problems problems will have two or three Lagrangian parameters, and can be solved using conventional techniques. See, e.g., S. Wenger et al., "Using RFC2429 and H.263+ at low to medium bit-rates for low-latency applications," Packet Video Workshop '99; R. Zhang et al., "Video coding with optimal Inter/Intra-mode switching for packet loss resilience," IEEE Journal on Selected Areas in Communications, vol. 18, no. 6, pp. 966-976, June 2000; R. Zhang et al., "Switched error concealment and robust coding decisions in scalable video coding," IEEE International Conference on Image Processing, October 2000.

Even using a simple optimization approach demonstrates the benefits of the present invention. For example, consider the following simple heuristic where the quantizers are fixed. With the desire to keep the amount of drift limited, each macroblock is coded based on the sum of the absolute error of the three possible predictions: $S_{nc}$, $S_{nf}$ and $S_{n(c+f)}$. If the drift for this macroblock will be larger than some threshold, $$S_{nc} \geq T_{drift}$$

the macroblock is coded using the prediction $$(\hat{P}_{nc} + \hat{P}_{nf})/2$$

Otherwise, the prediction that has the minimum sum of the absolute error is chosen. An encoder using this simple heuristic described above can be shown to outperform a range of other coders across a range of channel rates.

A more detailed optimization approach based on locally adaptive selection of quantizer and the prediction is herein described. Rather than fixing the quantizers and using a simple heuristic to choose which prediction should be used for each macroblock, both the quantizer $Q_f$ and prediction are changed with the goal of minimizing $$\Sigma_t R_f(t)$$

subject to $$\sum_t [(1-\gamma)\log D_f(t) + \gamma \log D_c(t)] \leq \sum_t \log D^*$$

where $R_f(t)$ and $D_f(t)$ are the rate and distortion produced when using $Q_f(t)$, and $D_c(t)$ is the distortion with only the coarse information, each at time step t. To simplify the notation, it is helpful to suppress the fact that the summation applies not only over all time steps, but also over all macroblocks in each frame.

The value of $\gamma$ depends on the application, and should be chosen to create a networkaware encoding. If the channel rate is expected to be generally close to $R_{min}$, then the parameter should be set close to 1. Then, the encoder will reduce the drift at the lower rates at the expense of the compression efficiency at higher rates. On the other hand, if the channel rate is expected to be generally greater than $R_{min}$ with occasional dips, then the parameter should be set close to zero.

Applying Lagrangian optimization, we choose $Q_f$ and the prediction method p such that $$\min_{\{p, Q_f\} \forall t} \sum_t [\mu R_f(t) + (1-\gamma)\log D_f(t) + \gamma \log D_c(t)]$$

Very simple models for rate and distortion may be used:

$$R = \frac{1}{2}\log(\sigma^2/D), \quad D_f = \frac{Q_f^2}{12}, \quad \text{and } D_c = \frac{Q_c^2}{12} + M_p,$$

where $M_p$ is a measure of the amount of mismatch between a given prediction p and the coarse prediction $$\hat{P}_{nc}$$

to account for the contribution of drift to $D_c$. Using these, the optimization equation becomes:

$$\min_{\{p, Q_f\} \forall t} \sum_t \left[\mu \log \sigma_p^2(t) + (1-\mu)\log \frac{Q_f(t)^2}{12} + \right.$$

$$\left. \gamma \log\left(\frac{Q_c(t)^2}{Q_f(t)^2}\right) + \gamma \log\left(1 + \frac{12 M_p(t)}{Q_c(t)^2}\right)\right]$$

where p indicates the prediction being evaluated, and the constant multiplier has been absorbed into μ.

In general, the first and fourth terms in the above equation depend on past predictions and quantizers, as well as on the prediction in the current time step. For example, consider the selection of the best predictor for a particular macroblock in frame t. This macroblock depends on up to four MBs in frame t−1. If a finer quantizer $Q_f$ had been used for those four MBs in frame t−1, then the prediction $$\hat{P}_f$$

in frame t would have had a smaller $$\sigma_p^2$$

but larger $M_p$. Because of this dependancy across time, joint optimization is required; however, a fully joint optimization requires a prohibitive search space.

Here, it is possible to ignore some of the dependencies to simplify the optimization procedure. Because the dependence on the previous prediction is generally weaker than the dependence on the previous quantizer, it is possible to first consider jointly only the quantizer selection at time t−1 with the prediction selection at time t. However, this is generally still too complicated because one MB in frame t depends on four different values of $Q_f$ in frame t−1. This is still too large a state space to reasonably consider.

Hence, it is advantageous to consider first the choice of the best quantizer for each MB in frame t−1 assuming the neighboring quantizers are identical, and consider second the choice of the best prediction using the selected quantizers.

Consider the second step first. Assuming the quantizers $Q_f$ and $Q_c$ are fixed for all time and that the current predictor depends only weakly on the previous predictors, the above optimization equation reduces to $$\min_{p(t)} \mu \log \sigma_p^2(t) + \gamma \log \left(1 + \frac{12 M_p(t)}{Q_c(t)^2}\right)$$

for frame t. Thus, to choose the best predictor given fixed quantizers, one can simply evaluate this equation for each of the three predictors $\hat{P}_{nc}$ $\hat{P}_{nf}$ $(\hat{P}_{nc} + \hat{P}_{nf})/2$ and choose the minimizing predictor. Note that in the case when γ=0, this simply chooses the predictor which has the minimum prediction error. If γ>0, the impact of drift is also considered.

The first step, to choose the best quantizer for a MB in frame t−1 assuming the prediction strategies are already fixed, is more complicated. One needs to consider the first and fourth terms of the optimization equation for frame t, and the second and third terms of the optimization equation for frame t−1. One can ignore the second and third terms for frame t because the quantizer $Q_f$ at time t is unknown, and can be assumed to be constant. The first and fourth terms for frame t−1 can be ignored because the predictor for t−1 is already fixed. Thus, to choose the quantizer $Q_f(t-1)$, one must minimize:

$$(1 - \mu)\log Q_f(t-1)^2 / 12 +$$

$$\gamma \log \left(\frac{Q_c(t-1)^2}{Q_f(t-1)^2}\right) + \mu \log \sigma_p^2(t) + \gamma \log \left(1 + \frac{12 M_p(t)}{Q_c(t)^2}\right)$$

For this first step, one must consider jointly the effect of the quantizer $Q_f(t-1)$ and the predictor p(t). A particular MB in frame t−1 may be used to predict multiple MBs in frame t. Therefore, all affected MBs in frame t are first determined via reverse motion compensation. For every possible quantizer $Q_f(t-1)$, it is assumed that the surrounding MBs use the same quantizer, and a determination is made of the best prediction of those affected MBs, as in the above equation for predictors. Then, the $Q_f(t-1)$ is chosen that minimizes the weighted cost of the affected MBs. To compute the appropriate weight, one can use the number of pixels in each MB in frame t that are impacted by the current MB in frame t−1.

Figure 4:
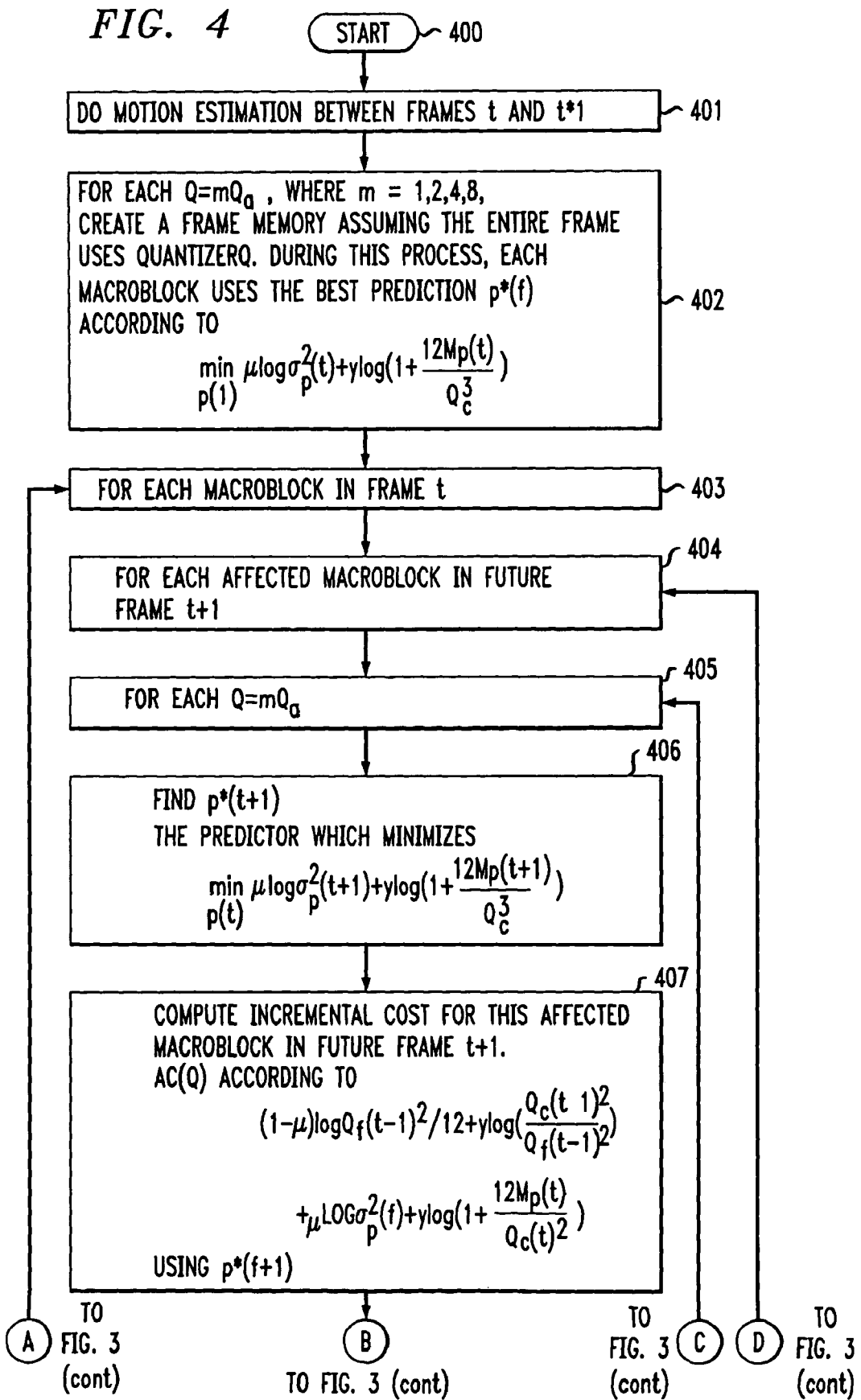
FIG. 4 is a flowchart illustrating the operation of the encoder in selecting effective encoding parameters, in accordance with an embodiment of the invention.
Figure 4:
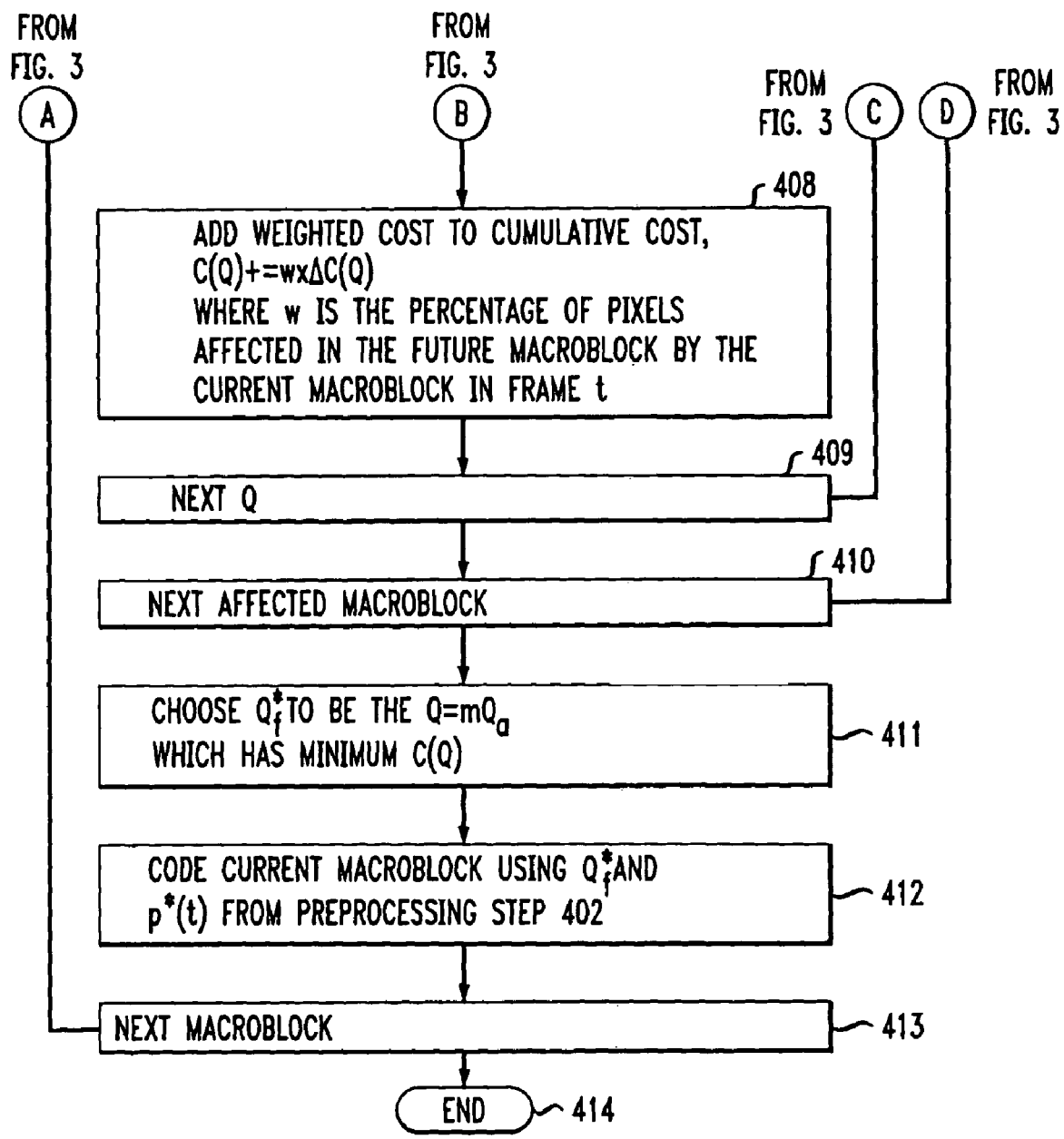

FIG. 4 sets forth a flowchart, illustrating an implentation of the above algorithm. Steps 401 and 402 are preprocessing steps, in which motion estimates are made and optimal predictors are chosen based on the predictor optimization equation above. From steps 403 to 413, each macroblock in frame t is considered. For each affected macroblock in a future frame t+1 and for each quantizer $Q=m\,Q_a$ (where m=1, 2, 4, 8), the predictor which minimizes the predictor optimization equation is determined which is used to compute the incremental cost for this affected macroblock, at steps 404 to 410. At step 411, the quantizer is chosen which has the minimum cumulative weighted cost. At step 412, the current macroblock is coded using the chosen quantizer and predictor.

In a current implementation of the drift-controlled coder, the inventors have set $Q_a=4$ and $Q_c=8Q_a$, with the choice of $Q_f$ and the prediction as described above. Such an implementation can be shown to significantly outperform alternatives across a range of channel rates without incurring significant drift for low channel rates.

The embodiment of the present invention described above enables effective drift management by incorporating the following features:

First, it advantageously provides a means to introduce drift incrementally. This is straightforward to achieve by bit-plane encoding or by creating an embedded bitstream. In order to be effective, this should be used in conjunction with a mechanism in the transport for providing more reliable delivery of the more important bitplanes to the receiver. See, e.g., P. A. Chou, et al., "FEC and pseudo-ARQ for receiver-driven layered multicast of audio and video," Data Compression Conference, pp. 440-449, March 2000; R. Rejaie, et al., "Quality adaptation for congestion controlled video playback over the Internet", Proceedings of ACM SIGCOMM '99, Cambridge, Mass., September 1999; which are incorporated by reference herein.

Second, it advantageously provides a way for the encoder to measure the drift being potentially introduced, so that the encoder knows when drift is becoming significant.

Third, it advantageously provides encoding options that can allow drift (i.e., allow errors in the enhancement layer to propagate into the base layer), while simultaneously keeping the amount of drift under control.

Fourth, it advantageously provides a means to drastically reduce or eliminate drift without the need for a full I-frame.

Fifth, it advantageously provides a system level optimization, designed to maximize expected quality across all expected receivers. Inherent to this optimization, there should be some (possibly inaccurate) knowledge on the part of the encoder as to how many errors the channel will introduce, and how those errors will be introduced (gradually bitplane by bitplane, or suddenly when an entire packet of high priority data is lost).

It should be noted that partial management of drift is still possible with different subsets of the above features.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws.

Embodiments within the scope of the present invention also include device readable media and computer readable media having executable program instructions or data fields stored thereon. Such computer readable media can be any available media which can be accessed by a general purpose or special purpose computing device.

It is to be understood that the embodiments shown and described herein are only illustrative of the principles of the present invention and that various modifications may be implemented by those skilled in the art without departing from the scope and spirit of the invention. For example, and without limitation, while the above discussion focuses on hybrid block-based DCT approaches to layering, the present invention can be readily extended to wavelet video coders that use some form of motion-compensated prediction. Furthermore, although the invention is described herein with respect to a decoder and encoder that has three levels of input/output and has two frame memories, etc., the present invention is not so limited and may be readily extended to other numbers of inputs, frame memories, and other components by one of ordinary skill in the art. Also, the above discussion focuses on ways to manage drift within the predictive framework of P-frames. Structures such as B-frames or P'-frames (which are similar to B-frames without forward prediction, and which are enabled by Reference Picture Selection (RPS) mode of annex N in H.263+) are not explicitly considered, even though these structures naturally reduce drift by having fewer predictions made from partially correct data. B- and P'-frames can easily be incorporated into the present system level structure, and indeed, a P'-frame is one way to limit the temporal extent of error propagation without an I-frame, even for a one-layer encoder.

One aspect of the encoder and decoder mentioned above is that they function according to instructions stored on tangible computer-readable media. For example, a hard drive, RAM, ROM, CD-ROM and the like, as are known in the art, will store instructions that will control a computing device to perform certain steps. The scope of such tangible computer-readable media is not broad enough to cover information in a person's memory, an error interface, or paper which may have instructions written thereon.

We claim:

1. A method for processing data comprising:
    encoding via a processor received video bits into a base layer of compressed video and an enhancement layer of compressed video;
    controlling via the processor drift introduced into the base layer of the compressed video based at least in part on coarse and fine motion compensation prediction and macroblock type;
    transmitting the base layer of compressed video;
    transmitting the enhancement layer of the compressed video;
    transmitting a second enhancement layer of the compressed video; and
    preventing errors from the second enhancement layer from propagating to the base layer based at least on the coarse and fine motion compensation prediction and the macroblock type.

2. The method of claim 1, wherein the base layer is transmitted to a first output and the enhancement layer is transmitted to a second output.

3. The method of claim 1, wherein preventing errors is associated with the steps of encoding and controlling the drift.

4. The method of claim 1, wherein controlling the drift further comprises selecting an amount of drift by including control information in the compressed video.

5. The method of claim 4, wherein the control information comprises an error prediction strategy.

6. The method of claim 4, wherein the control information comprises adjustments to quantization.

7. The method of claim 1, wherein the step of encoding further utilizes:
    a coarse frame memory that depends only on the base layer;
    a fine frame memory that depends on the enhancement layer and the base layer, wherein the coarse frame memory and the fine frame memory provide predictions used in the step of controlling drift.

8. A tangible computer-readable medium storing via a processor that control a computing device to perform the following steps for processing data:
    encoding via a processor received video bits into a base layer of compressed video and an enhancement layer of compressed video based at least in part on coarse and fine motion compensation prediction and macroblock type;
    controlling via a processor drift introduced into the base layer of the compressed video;
    transmitting the base layer of compressed video;
    transmitting the enhancement layer of the compressed video;
    transmitting a second enhancement layer of the compressed video; and
    preventing errors from the second enhancement layer from propagating to the base layer.

9. The computer-readable medium of claim 8, wherein the base layer is transmitted to a first output and the enhancement layer is transmitted to a second output.

10. The computer-readable medium of claim 8, wherein preventing errors is associated with the steps of encoding and controlling the drift.

11. The computer-readable medium of claim 8, wherein controlling the drift further comprises selecting an amount of drift by including control information in the compressed video.

12. The computer-readable medium of claim 11, wherein the control information comprises an error prediction strategy.

13. The computer-readable medium of claim 11, wherein the control information comprises adjustments to quantization.

14. The computer-readable medium of claim 8, wherein the step of encoding further utilizes:
    a coarse frame memory that depends only on the base layer;
    a fine frame memory that depends on the enhancement layer and the base layer, wherein the coarse frame memory and the fine frame memory provide predictions used in the step of controlling drift.

15. A method of encoding data, comprising:
    receiving an uncompressed video stream at an encoder;
    encoding via the encoder the uncompressed video stream (1) into at least a base layer, and (2) as a drift-aware bitstream; and
    prioritizing the transmission of the drift-aware bitstream, wherein drift introduced into the base layer is controlled.

16. The method of claim 15, wherein encoding the video stream as a drift-aware bitstream further comprises utilizing control information for managing drift.

17. The method of claim 16, wherein the control information is at least one of: an error prediction strategy and adjustments to quantization.

18. A method of decoding data, comprising:
receiving a first error prediction depending on base layer information;
receiving a second error prediction depending on base layer information and enhancement layer information; and
combining the first and second error predictions according to macroblock information, resulting in a prediction that is applied to a video stream.

19. The method of claim 18, wherein the first and second error predictions are received from a course and a fine motion-compensated frame memory respectively.

20. The method of claim 18, wherein combining the first and second error predictions reduces drift in according with an option in the macroblock information.

21. The method of claim 18, wherein combining the first and second error predictions eliminates drift in accordance with an option in the macroblock information.

22. The method of claim 18, wherein combining the first and second error predictions allows drift in accordance with an option in the macroblock information.

* * * * *